United States Patent [19]

Neil

[11] 3,808,927
[45] May 7, 1974

[54] TRANSPORTING AND TRIMMER APPARATUS FOR PLASTIC FILM HAVING THERMOFORMED ARTICLES THEREIN

[75] Inventor: Peter C. Neil, Fullerton, Calif.

[73] Assignee: Standard Oil Company (Indiana), Chicago, Ill.

[22] Filed: June 12, 1973

[21] Appl. No.: 369,259

Related U.S. Application Data

[62] Division of Ser. No. 280,518, Aug. 14, 1972, which is a division of Ser. No. 133,125, April 12, 1971.

[52] U.S. Cl. .................. 83/228, 83/420, 83/444, 83/925 R
[51] Int. Cl. .............................. B26d 7/16
[58] Field of Search ........... 83/228, 251, 253, 254, 83/268, 449, 450, 420, 419, 418, 925 R, 444

[56] References Cited
UNITED STATES PATENTS
3,490,323  1/1970  Jensen et al. ................ 83/418 X
2,067,943  1/1937  Nordquist ..................... 83/228

Primary Examiner—J. M. Meister
Attorney, Agent, or Firm—Robert B. Stevenson; Arthur G. Gilkes; William T. McClain

[57] ABSTRACT

Disclosed is an apparatus for transporting a thin film of plastic having integral therewith a thermoformed article of manufacture and protrusions which facilitate guiding and advancing the film through the apparatus. The apparatus includes first and second guides spaced apart to provide a pathway. At least some of the guides include grooves which receive the protrusions. The guides also include slots which expose some of the protrusions, permitting a moving indexing finger to extend through the slots and engage the exposed protrusions. A trimmer is provided which includes a punch and die, and a film locator which engages at least one of the protrusions and brings the article of manufacture into proper alignment in the punch and die. The block carrying the punch is spring-loaded and biased to counter gravity. This provides a free-floating assembly which facilitates alignment of the punch and die.

2 Claims, 8 Drawing Figures

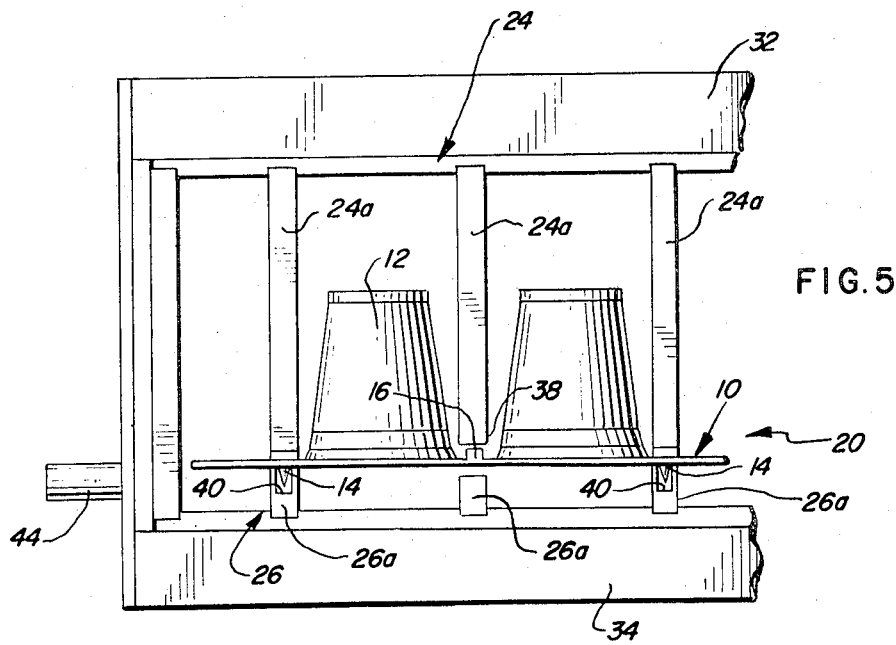
FIG. 5
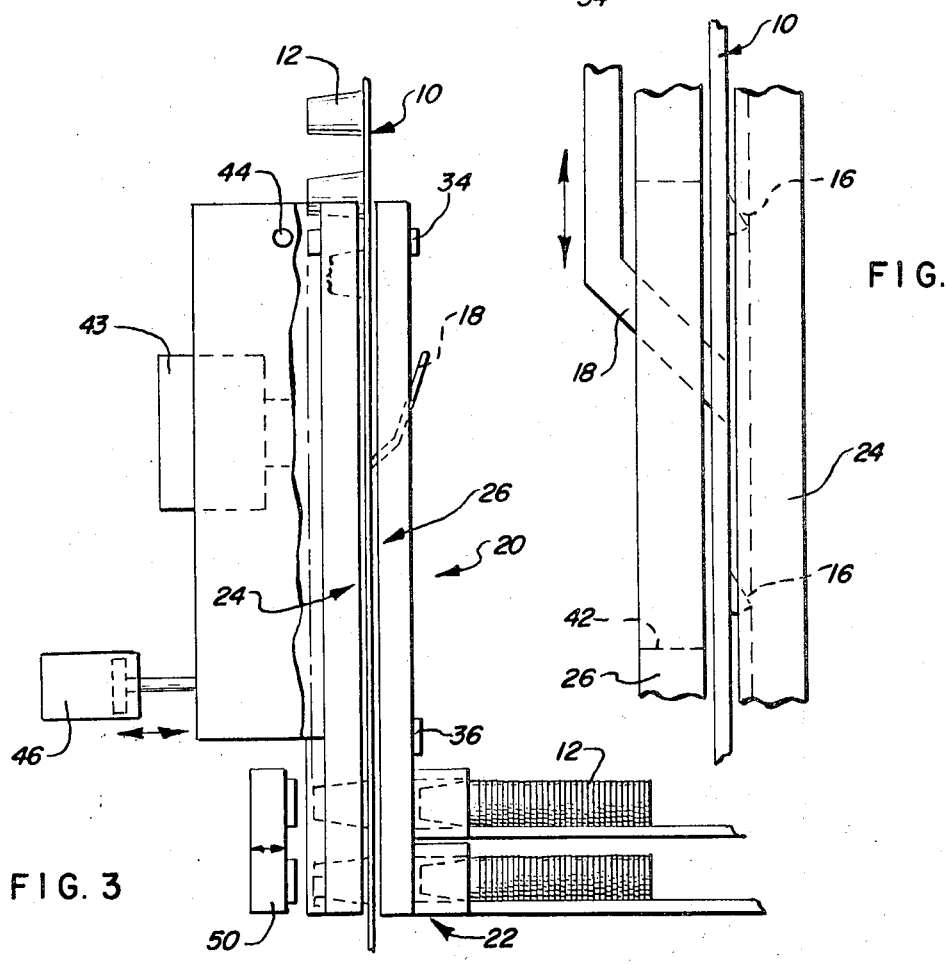
FIG. 6
FIG. 3

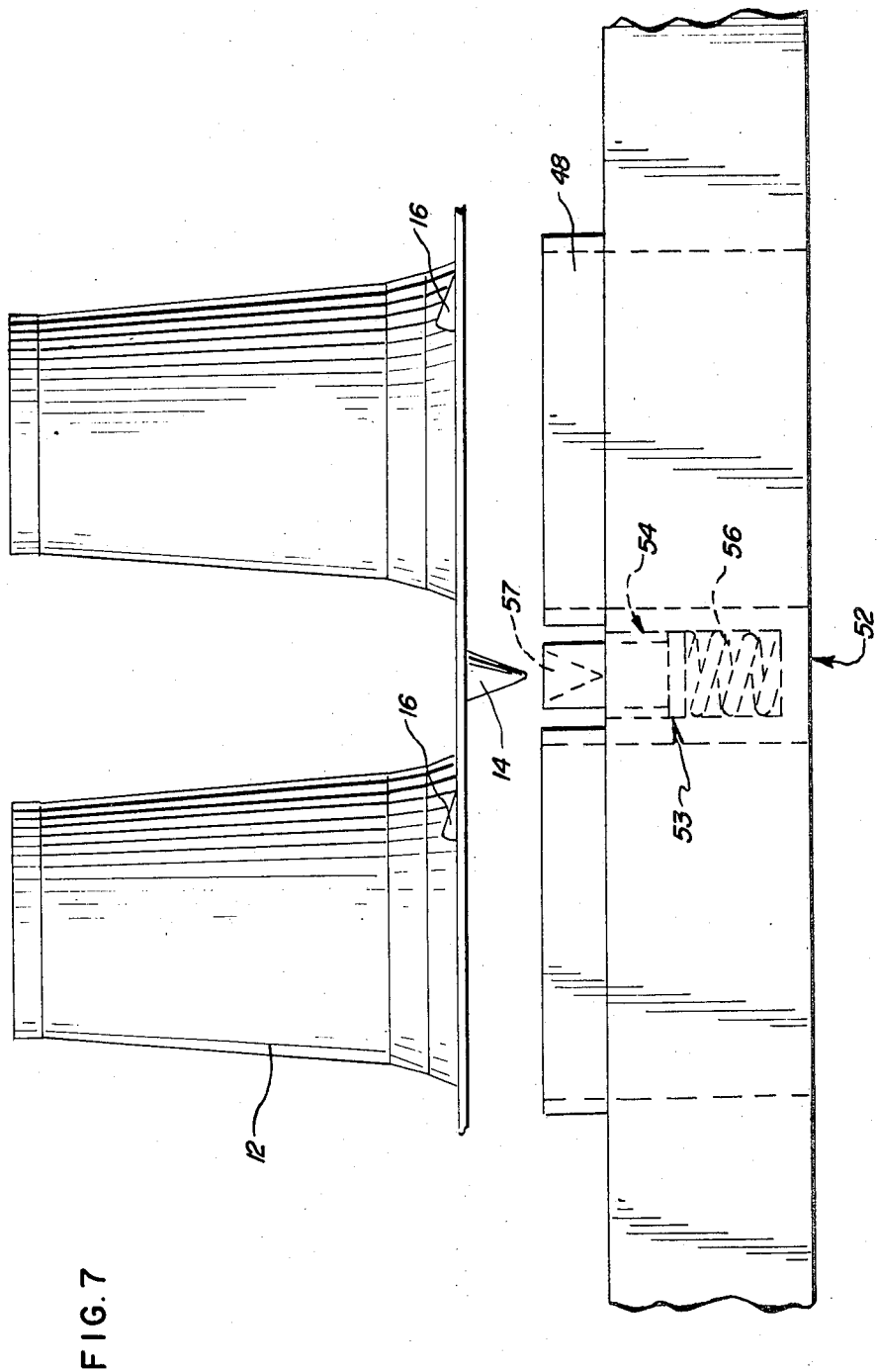

3,808,927

TRANSPORTING AND TRIMMER APPARATUS FOR PLASTIC FILM HAVING THERMOFORMED ARTICLES THEREIN

This is a division, of application Ser. No. 280,518 filed Aug. 14, 1972, which is a divisional of application Ser. No. 133,125, filed Apr. 12, 1971.

BACKGROUND

In cutting a thermoformed article of manufacture integral with a thin film of plastic, it is necessary to exactly align the article of manufacture in the punch and die assembly of a trimming apparatus. A transporting apparatus moves the film to the punch and die assembly in a stepwise fashion and, with the film momentarily stopped, the punch moves into engagement with the die, cutting the article of manufacture from the film. The punch must be in exact alignment with the die, otherwise the die will be damaged. Accordingly, it is the object of my invention to provide an improved transport apparatus which brings the film into proper alignment with the punch and die in a manner which is simpler and more reliable than prior art devices. It is another object of my invention to provide an improved trimmer apparatus in which the punch and die are easily aligned and maintain such exact alignment with prolonged use.

THE INVENTION

I have invented an apparatus for transporting to a trimmer a thin film of plastic having integral therewith thermoformed articles of manufacture. According to my invention there are also protrusions in the film which facilitate guiding and advancing the film through the apparatus. The protrusions may protrude from the same side of the film or from different sides of the film. Preferably, two different types of protrusions are employed. One set is specifically designed to guide the film through the apparatus. The second set is designed to cooperate with the film indexing or moving means which is inserted into one of the second protrusions. Thus the film is advanced through the apparatus without inadvertent slippage of the indexing means.

My transporting apparatus includes first and second guide means spaced opposite each other to provide a pathway therebetween which permits the film to advance therethrough. The guide means are generally vertical and preferably are mounted to move. Some of the guide means include grooves which receive some protrusions and slot means which expose at least some of said protrusions. Film indexing means is provided for moving the film through the apparatus in a stepwise fashion. The indexing means includes means which extends through the slot means and engages the exposed protrusions. This indexing means may move up and down relative to the surface of the film, riding across this film's surface. When it traverses a protrusion designed for sheet advancing, it is inserted into this protrusion due to the action of a spring.

In accordance with another feature of my invention, a novel trimmer is provided for cutting the article from the film. This trimmer includes punch and die means and means connected to the punch and die means which engage at least one of the protrusions in the film to bring the article of manufacture in proper alignment in the punch and die means. My trimmer preferably includes a post means and die means fixed to the frame of the trimmer. Block means are mounted through bearing means on the post and adapted to move toward and away from the die means, sliding on the post means. Punch means are secured to the block means and aligned with the die means and adapted to move with the block means to engage said die means. Spring means support the block means and are biased to counter the force of gravity exerted on the block means. Consequently, the block means are substantially free-floating. This permits the punch and die means to be easily aligned and to maintain such alignment.

DESCRIPTION OF DRAWINGS

FIG. 3 is a side elevational view of my apparatus schematically showing the film of FIGS. 1 and 2 moving between the guides of the transport apparatus.

FIG. 5 is a partial plan view of the transport apparatus shown in FIGS. 3 and 4, showing the film as it moves between the guides.

FIG. 6 is an enlarged view showing the action of the indexing means as it moves the film between the guides.

FIG. 7 is an enlarged schematic view of the dies of the trimmer apparatus, showing locating means for properly aligning the film relative to the dies.

PREFERRED EMBODIMENTS

Figure 1:
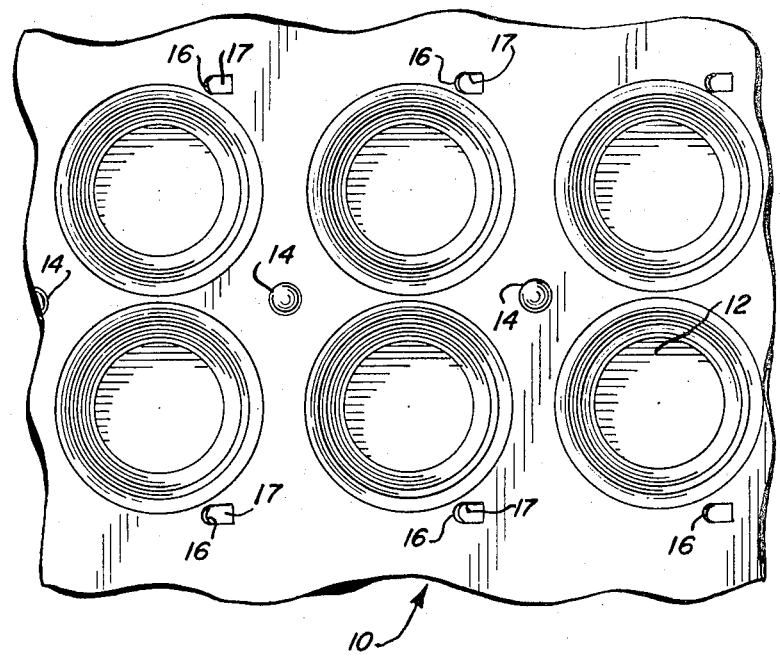
FIG. 1 is a plan view of a film of plastic having integral therewith articles of manufacture and protrusions which facilitate guiding and advancing the film through the transport apparatus of my invention.
Figure 2:
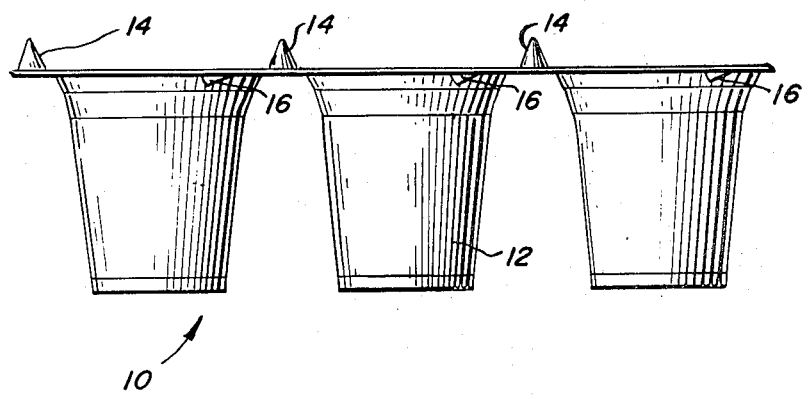
FIG. 2 is a side view of the film shown in FIG. 1.

Film 10, shown in FIGS. 1 and 2, has integral therewith articles of manufacture 12, such as cups, guide protrusions 14 and sheet advancing protrusions 16. Preferably, protrusions 14 and 16 project from opposite sides of film 10, but they may project from the same side of the film. The guide protrusions 14 are aligned in one row and the sheet advancing protrusions are aligned in another row. This also is a preferred configuration but is not required. The guide protrusions 14 are preferably of a conical shape and the sheet advancing protrusions 16 are of a wedge shape, with the inside of these protrusions providing a cavity 17 into which film advancing index fingers 18 are inserted (only one finger shown, FIG. 6).

Transporting apparatus 20 (FIGS. 3–5) of my invention is designed to cooperate with guide and sheet advancing protrusions 14 and 16 to advance film 10 to trimmer 22 (FIG. 8) in a stepwise fashion. My transporting apparatus 20 includes two sets of guides 24 and 26. Guide 24 includes vertical members 24a (FIG. 5) and guide 26 includes vertical members 26a. These vertical members are spaced apart relative to each other to permit articles of manufacture 12 to fit between adjacent pairs of members. Such members are also spaced opposite each other to provide a pathway between members 24a and 26a for film 10.

Some of members 24a include grooves 38 (FIG. 5) which receive sheet advancing protrusions 16 as film 10 moves along the pathway. Some of members 26a include grooves 40 (FIG. 5) which receive guide protrusions 14. Slots 42 (FIG. 6) are located in the lower portion of members 26a, and such slots are adapted to permit indexing fingers 18 to move therein and be inserted into cavity 17 formed in sheet advancing protrusions 16.

Figure 4:
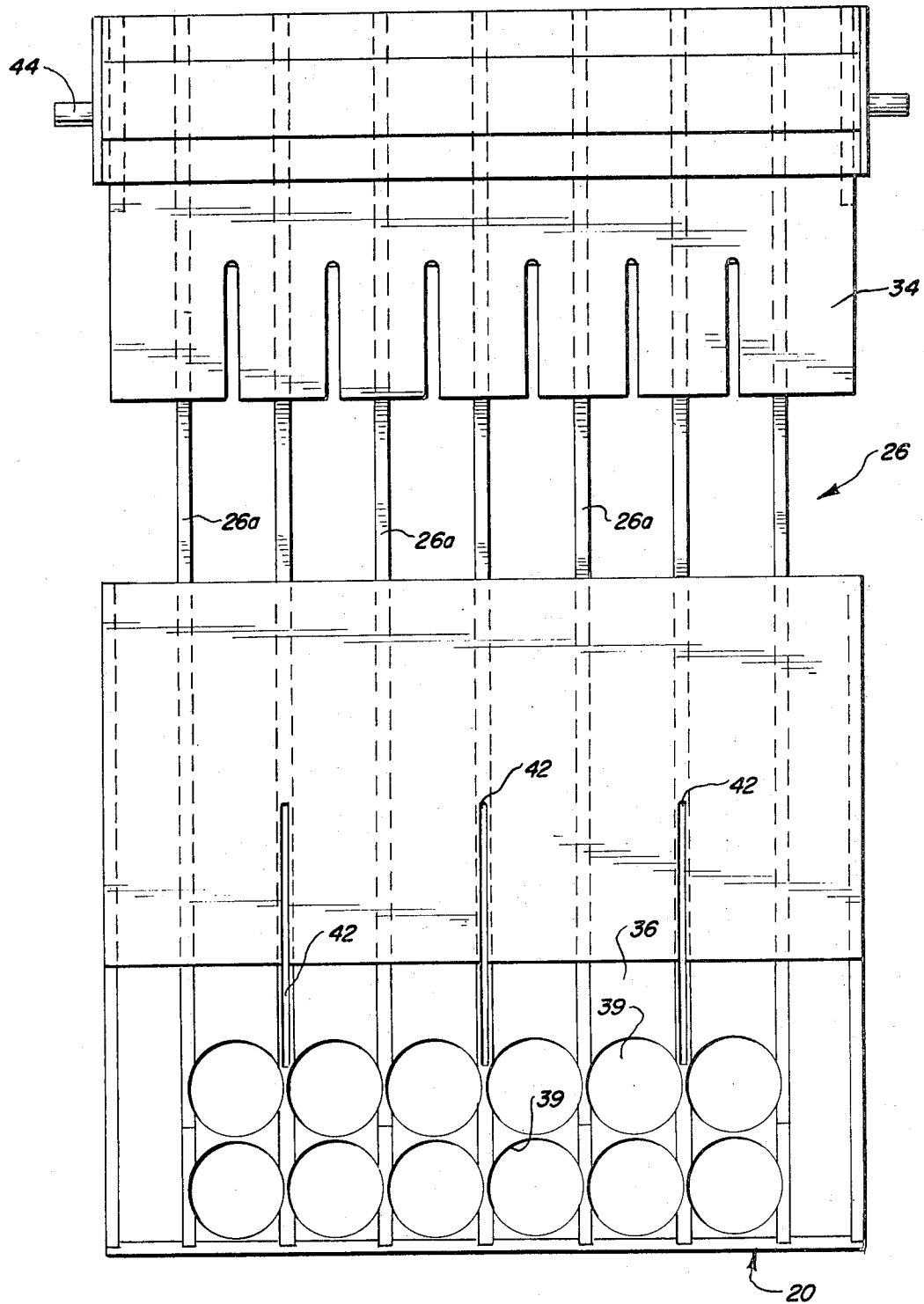
FIG. 4 is a front elevational view of the transport apparatus shown in FIG. 3.

As shown in FIGS. 4 and 5, members 24a are connected together by plates 32 (only one shown, FIG. 5) and members 26a are connected together through upper plate 34 and lower plate 36. Plate 36 includes openings 39 affording access to film 10. The entire transport apparatus 20 is mounted at 44 to pivot, and cylinder 46 is connected to the apparatus frame and adapted to move apparatus 20 about this pivot. Moving apparatus 20 about pivot 44 is sometimes required to introduce film 10 into trimmer 22. Optionally, apparatus 20 may include means 43 for cutting small holes in articles 12, for example, if the articles are lids, a hole to accommodate a straw.

As best illustrated in FIG. 6, indexing fingers 18 advance the film in a stepwise fashion along the pathway between guides 24 and 26 to trimmer apparatus 22. Fingers 18 travel upwardly along the surface of film 10 until they reach the top of slots 42. They stop momentarily and, due to the action of a spring (not shown), they are inserted into cavity 17 of protrusions 16. Thus inserted into cavity 17, fingers 18 move downwardly, pushing film 10 toward trimmer 22 until fingers 18 reach the bottom of slots 42. At this point the direction of their movement is reversed. Guides 14, as they move along grooves 40, prevent lateral deviation of film 10. Thus articles 12 are in lateral registration when they reach trimmer 22.

Figure 8:
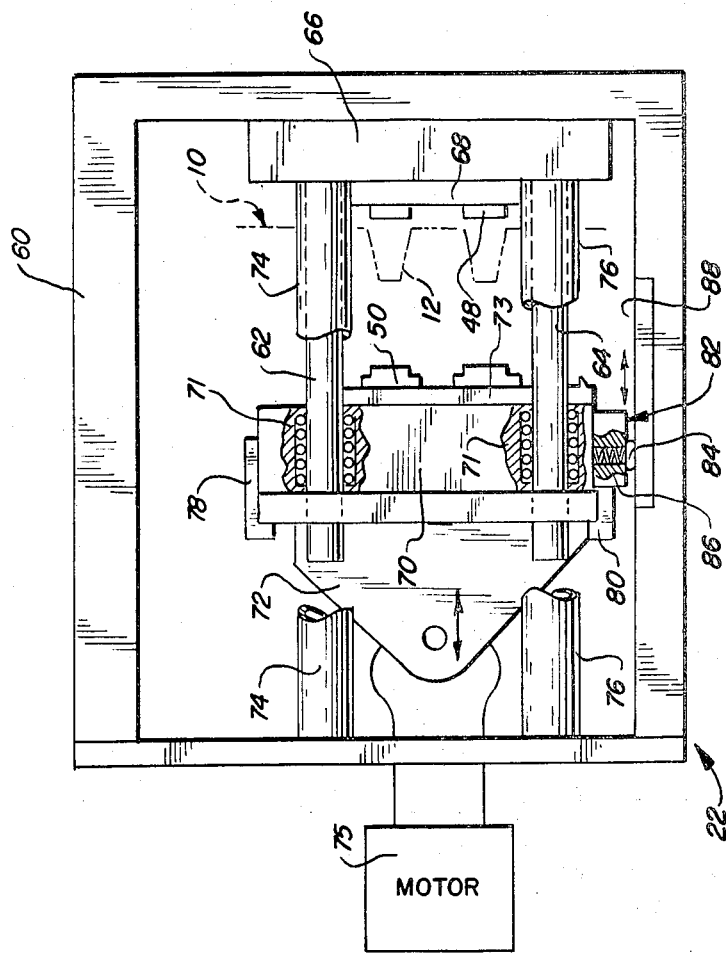
FIG. 8 is a side elevational view, with sections broken away, showing schematically the trimmer apparatus of my invention.

Trimmer 22 is also designed to cooperate with guide protrusions 14 and, as shown in FIGS. 7 and 8, it includes, in addition to dies 48 and punches 50, cone locators 52 which serve to engage guide protrusions 14 as film 10 moves between the punches and dies. These cone locators 52 include a movable cylindrical element 53. Spring 56, nestled in bore 54 in bolster plate 68 (FIG. 8) and attached to element 53, urges this element 53 toward film 10. The element 53 includes cavity 57 into which the cone of guide protrusions 14 seeks when film 10 is pressed against dies 48. Protrusions 14 move into cavities 57, thus properly aligning articles 12 with dies 48.

As best shown in FIG. 8, trimmer 22 is also designed to reduce wear on dies 48 and improve the alignment of punches 50 with dies 48. According to this feature of my invention, trimmer 22 includes frame 60 to which are fixed die-set posts 62 and 64 and stationary die shoe 66. Dies 48, through bolster plate 68, are bolted into position on die shoe 66. Punch block 70 is carried on die-set posts 62 and 64, and this block includes channels through which extend the die posts. Ball bearing bushings 71 carry block 70 on die posts 62 and 64, and punches 50 are secured, through bolster plate 73, to block 70 and move into alignment with dies 48 as the block is moved to and fro by ram 72. Motor 75 moves ram 72 which is carried by ram guide pins 74 and 76 mounted on frame 60. Toe clamps 78 and 80 hold block 70 in position on ram 72, and ball bushing base 82 is secured to block 70. This ball bushing base 82 includes ball bearing 84 and spring 86 which is biased upward to counter the force of gravity pulling on block 70. Ball bearing 84 rides on wear plate 88, which can be replaced from time to time as needed. Block 70 is thus free-floating. However, the spring 86 pushes upward on block 70 against the force of gravity thus taking the weight off die-set posts 62 and 64. This reduces the wear on ball bearing bushings 71 and insures proper alignment of punches 50 with dies 48. For example, block 70 may weigh as much as two and one-half tons, and the tolerance between the punches and the dies can be as little as 0.0005 inch. Consequently, with the block free-floating, proper alignment between the punches and the dies can be easily achieved and maintained.

I claim:

1. Apparatus for transporting and trimming a thin film of plastic having integral therewith a thermoformed article of manufacture and protrusions which facilitate guiding and advancing the film, comprising first and second guide means spaced opposite each other to provide a pathway therebetween which permits the film to advance therethrough, at least some of said guide means including grooves therein which receive at least some of the protrusions, and slot means which expose at least some of said protrusions;

indexing means for moving the film through the apparatus between the guide means and along said pathway, said indexing means including means which extend through the slot means and engage the exposed protrusions; and trimmer means for cutting the article of manufacture from the film, said trimming means including punch and die means and means which engage at least one of the protrusions in the film to bring the article of manufacture into proper alignment in the punch and die means.

2. The apparatus of claim 1 wherein the punch and die means include spring means biased to counter gravity.

* * * * *